(12) United States Patent
Pace et al.

(10) Patent No.: US 8,101,264 B2
(45) Date of Patent: Jan. 24, 2012

(54) VEHICLE STRUCTURE WITH THREE DIMENSIONAL FILM AND METHOD

(75) Inventors: Jessica Ann Pace, Dublin, OH (US); Naoto Fujiwara, Marina Del Rey, CA (US); Todd Stephen Copeland, Raymond, OH (US); Corey Scott McEnhill, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1036 days.

(21) Appl. No.: 11/464,947

(22) Filed: Aug. 16, 2006

(65) Prior Publication Data

US 2008/0044600 A1 Feb. 21, 2008

(51) Int. Cl.
*B41M 5/00* (2006.01)

(52) U.S. Cl. ....... 428/195.1; 428/216; 428/31; 428/204; 428/209

(58) Field of Classification Search .......... 428/95.1, 428/204, 209, 31
See application file for complete search history.

(56) References Cited

U.S. PATENT DOCUMENTS

| | | | |
|---|---|---|---|
| 3,549,407 A | | 12/1970 | Williamson |
| 3,580,768 A | | 5/1971 | Kukla |
| 4,475,975 A | | 10/1984 | Talley et al. |
| 4,551,387 A | | 11/1985 | Manabe et al. |
| 5,017,638 A | | 5/1991 | Handa et al. |
| 5,147,706 A | * | 9/1992 | Kingman .................. 428/195.1 |
| RE36,457 E | * | 12/1999 | Ellison et al. .................. 428/31 |
| 5,997,627 A | | 12/1999 | Babler |
| 6,045,646 A | | 4/2000 | Yoshikawa et al. |
| 6,110,547 A | | 8/2000 | Sano et al. |
| 6,113,149 A | * | 9/2000 | Dukatz ............................ 283/91 |
| 6,558,496 B1 | | 5/2003 | Brooke et al. |
| 6,673,428 B1 | * | 1/2004 | Reafler .......................... 428/216 |
| 6,677,065 B2 | * | 1/2004 | Blauer ............................ 428/31 |
| 6,713,522 B2 | | 3/2004 | Zhang et al. |

(Continued)

FOREIGN PATENT DOCUMENTS

JP 59-71798 U 5/1984

(Continued)

OTHER PUBLICATIONS

International Search Report and the Written Opinion of the International Searching Authority for PCT Patent App. No. PCT/US07/76091 (Jan. 29, 2008).

(Continued)

*Primary Examiner* — Bruce H Hess
*Assistant Examiner* — Tamra L Amakwe
(74) *Attorney, Agent, or Firm* — Kenealy Vaidya LLP; Mark E. Duell

(57) ABSTRACT

A vehicle structure can include a coating that provides a three-dimensional tactile pattern to the vehicle structure. In addition, a method for forming a vehicle structure can include applying a film that provides a three-dimensional tactile pattern to the vehicle structure. The vehicle structure can be a trim piece of a vehicle to which the film provides decorative and tactile features. A thin metal layer can be applied on top of a substrate by a metallizing technique, such as physical vapor deposition, followed by applying a radiation curable formulation and exposing it to radiation source, such as UV light. The radiation curable formulation can be a UV ink that is spaced at separate and distinct locations on the film and extends from the metallic layer to such an extent that it is discernable by human touch.

15 Claims, 3 Drawing Sheets

U.S. PATENT DOCUMENTS

| | | |
|---|---|---|
| 2002/0050665 A1 | 5/2002 | Roys et al. |
| 2002/0119259 A1 | 8/2002 | Kamei et al. |
| 2002/0175450 A1 | 11/2002 | Ishii |
| 2003/0037443 A1 | 2/2003 | Mithal et al. |
| 2004/0029030 A1 | 2/2004 | Murray |
| 2004/0258905 A1 | 12/2004 | Hase et al. |
| 2005/0142371 A1 | 6/2005 | Swain et al. |

FOREIGN PATENT DOCUMENTS

| | | |
|---|---|---|
| JP | 63143252 | 6/1988 |
| JP | 2251273 | 10/1990 |
| JP | 7-32476 A | 2/1995 |
| JP | 10005688 | 1/1998 |
| JP | 11158428 | 6/1999 |
| JP | 2000052700 | 2/2000 |
| JP | 2004-276416 A | 10/2004 |

OTHER PUBLICATIONS

A Supplementary European Search Report dated Oct. 19, 2009.
Japanese Office Action and English translation thereof for Japanese Patent Application No. 2009-524802 dated Oct. 5, 2011.

* cited by examiner

VEHICLE STRUCTURE WITH THREE DIMENSIONAL FILM AND METHOD

BACKGROUND

1. Field

The disclosed subject matter relates to a vehicle structure/surface that has a three dimensional tactile coating and its associated method of manufacture. More specifically, the disclosed subject matter relates to a vehicle substrate surface that is provided with a coating that has a three-dimensional tactile pattern as well as a unique three dimensional appearance for either interior or exterior surfaces.

2. Brief Description of the Related Art

The relevant art describes various ways of applying paints and/or metal film layers to substrates in order to achieve a particular visual appearance. These coating methods depend, in part, on the type of substrate, the coatings to be applied, and the desired visual appearance of the substrate. For example, in the automotive industry, it is advantageous to provide certain elements, such as body trim pieces, with a metallic appearance to match an automobile body part, or even to enhance the appearance of said body part.

In the automotive industry, there has been a great demand for a protective, functional, yet decorative coating that would also serve to minimize or mask the appearance of surface defects. However, this demand has not been previously met.

For example, U.S. Pat. No. 5,017,638 describes a novel metallic paint film giving an intensified metallic feeling when viewed at the front, as well as having good flip-flop characteristics. Also, U.S. Pat. No. 3,580,768 describes a paint with a three-dimensional effect created by applying liquid drops onto a painted surface, drying the paint surrounding the liquid drops, then re-spraying the entire surface with the paint. Japanese Patent No. 2000052700 describes an automobile coating film that includes paint particles of coarsened paint to provide mottled patterns of light luminous parts. Further, Japanese Patent No. 10005688 discloses a three-dimensional design pattern for an automobile surface which is accomplished by applying a photo-curable material to the surface, applying a pattern film, photo-curing the exposed photo-curable material, then removing non-cured parts to form a projected pattern. U.S. Patent Publication No. 2002/0119259 describes a physical vapor deposition (PVD) film on an automobile body that provides a decorative metallic appearance and can be coated by ultraviolet (UV) curable paint. Further, U.S. Pat. No. 5,017,638 discloses a metallic paint film that provides a "three-dimensional effect." Each of the above-described related art references is hereby incorporated by reference in its entirety.

However, the above-described related art does not solve the immediate need for coating a substrate to produce a decorative effect.

SUMMARY

The disclosed subject matter relates to a coating and a method of coating a substrate for vehicle surface applications. The method can include applying a thin layer to a substrate using a metallizing technique, applying a radiation curable formulation on top of said thin layer, exposing said radiation curable formulation to a radiation source, and producing a three-dimensional tactile pattern on a vehicle surface. An embodiment of the method includes providing a thin layer which has a metallic appearance, where the thin layer may be a metal such as chrome, satin nickel, aluminum, stainless steel, copper, bronze, silver, gold, etc. The coating can be applied to various vehicle surfaces, including the audio panel, the steering wheel garnish, the shifter escutcheon, the cup holder, the door garnish, etc. The three-dimensional pattern can be almost any conceivable pattern that a designer chooses for the vehicle surface, including lines, ornamental configurations, multiple color patterns, indicia, brail, logos, simulated wood, simulated metal, simulated plastics, etc.

According to an aspect of the disclosed subject matter, a vehicle structure that has a three dimensional coating can include a film, including, a metallic layer, and a hardened ink located on top of the metallic layer. The hardened ink can be located in a plurality of areas that are separate and distinct from each other and extend away from the metallic layer to such an extent that the separate and distinct areas of hardened ink form a three-dimensional pattern that is discernable to a human touch. A vehicle surface substrate can be located below the film.

In accordance with another aspect of the disclosed subject matter, a method of providing a three-dimensional tactile surface on a vehicle surface can include forming a film by applying a thin layer to a film substrate using a metallizing technique, applying a radiation curable formulation on top of the thin layer, and exposing the radiation curable formulation to a radiation source to produce a three-dimensional tactile pattern on top of the thin layer. The method can also include injection molding the film onto a vehicle surface substrate.

In another embodiment, the coating and method involves a metallizing technique such as physical vapor deposition (PVD) or chemical vapor deposition (CVD). In still another embodiment, the PVD coating and method include ion plating, ion implantation, and sputtering.

In still another embodiment, the coating and method employ UV ink as a radiation curable formulation.

In yet another embodiment, the coating and method yields a three-dimensional tactile pattern including a plurality of dots. In another embodiment, the plurality of dots can occupy any amount of the surface are, from 0% to 100% of the total surface area of the thin layer. The dots may also have a dot density of any amount that can be determined by aesthetic requirements or application requirements.

In still another embodiment, the coating and method include a substrate that is flexible, semi-flexible or rigid.

In another embodiment, the method of the invention includes a plurality of dots having different diameters. The dots may also have various shapes, including elongate shapes that simulate wood grain, carbon fiber, geometrical shapes, metallic cross-hatched shapes, or any other shape that a designer may determine is useful for a particular application. Other shapes that can be used include lines, oblong dots, ornamental configurations, multiple color dots, indicia, brail, logos, etc.

In another embodiment, the invention includes a method of applying a decorative coating to a substrate that includes applying a thin metal layer to a substrate using a PVD technique, applying UV ink on top of said thin metal layer, exposing said UV ink to a radiation source, and producing a plurality of dots on said thin metal layer.

In still another embodiment, the method includes a plurality of dots that produce a three-dimensional tactile pattern.

Still other features and characteristics of the disclosed subject matter will become apparent to those skilled in the art from a reading of the following detailed description of embodiments constructed in accordance therewith, and taken in conjunction with the accompanying drawings.

BRIEF DESCRIPTION OF THE DRAWINGS

The disclosed subject matter will now be described in more detail with reference to exemplary embodiments of the method and coated vehicle structure, given only by way of example, and with reference to the accompanying drawings, in which.

DETAILED DESCRIPTION OF EXEMPLARY EMBODIMENTS

The disclosed subject matter relates to a film, such as a physical vapor deposition (PVD) film, having a decorative appearance and that is applied to a substrate, and its method of application.

The term "substrate" refers to a single layer or multilayer component wherein the surface of said substrate is prepared by conventional means known in the art, so that the substrate will readily accept the application of a thin layer thereon. For example, various materials can be applied to the top of the substrate to prepare the substrate for receipt of the metallic film, e.g., adhesive base coats, base materials, adhesion promoters, tie layers, etc. Furthermore, the disclosed subject matter relates to a method of producing three-dimensional effect designs on the substrate.

Figure 1:
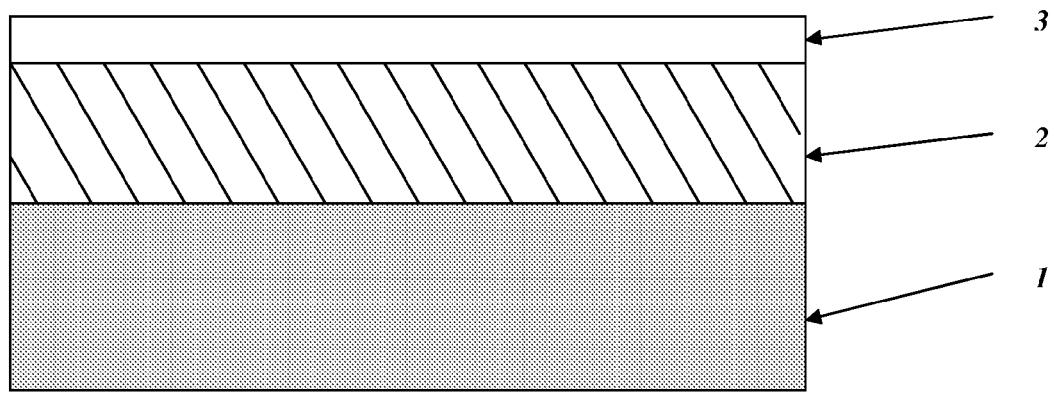
FIG. 1 is a cross-sectional view (layers 1, 2 and 3) of an embodiment of an element formed by a method according to the disclosed subject matter.
Figure 2:
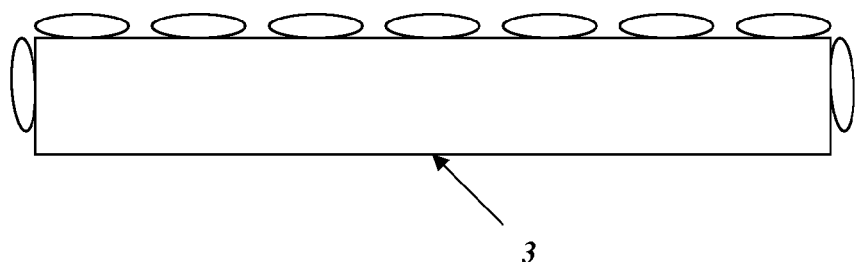
FIG. 2 is an illustration of an embodiment of a three-dimensional tactile pattern formed by a method according to the disclosed subject matter.

In this application, the term "element" is used to describe the multilayer component produced by the method of the disclosed subject matter. As illustrated in FIG. 1, the element can include a plurality of layers. The plurality of layers can include a first layer 1 (the substrate), a second layer 2 (the thin layer), and a third layer 3 (a three-dimensional tactile pattern). The element can be used with various types of machines or structures for enhancing visual appearance, such as a decorative appearance. These structures and machines can include many types of substrate materials, for example, motorcycles, walls, trucks or automobile body parts, including decorative trim pieces, bumpers, interior trim components, exterior mirror housings, and the like. More specifically, the film can be used in conjunction with vehicle audio panels, steering wheel garnishes, vehicle shifter escutcheons, vehicle cup holders, vehicle door garnishes, etc.

In the first layer 1, the substrate can be flexible, semi-flexible or rigid, and its shape can be formed using any of a plurality of conventional molding or extrusion processes. For example, the first layer 1 can be made by a conventional coating method such as those disclosed in U.S. Pat. Nos. 5,837,354 and 4,551,387. The second layer 2 may be a thin metal film or a paint that matches that of the body part or other structure that is being coated. This layer 2 can be deposited by a metallizing method such as vacuum metallization or vacuum deposition. As disclosed in U.S. Patent Publication No. 2003/0037443 A1, vacuum deposition is a term applied to processes that deposit atoms or molecules one at a time, such as physical vapor deposition (PVD) or low pressure chemical vapor deposition (LPCVD), which are all contemplated for use with the disclosed subject matter. Various types of PVD are known in the art, including vacuum evaporation, sputter deposition or sputtering. Physical vapor deposition methods are clean, dry vacuum deposition methods in which the coating is deposited over the entire object simultaneously, rather than in localized areas. Reactive PVD hard coating processes combine a method for depositing the metal, in combination with an active gas, such as nitrogen, oxygen, or methane, and plasma bombardment of the substrate to ensure a dense, hard coating. The primary PVD methods are ion plating, ion implantation, and sputtering.

The third layer 3 can be a radiation curable formulation that is applied on top of the second layer 2. This layer 3 can be a hardened substance that provides a tactile three-dimensional pattern to the structure.

In an embodiment of the disclosed subject matter, the metallizing technique is by PVD. A sputtering process can be used to cover the first layer 1 with a thin metal layer 2 or sheet that provides a metallic appearance on the first layer 1. Furthermore, the thin metallic coating can be of a sufficient thickness to impart a reflective metal-like appearance to the element, or to provide a wood grain appearance, or other various appearances. Also, the thin metallic coating can be any size range, and possibly from 0 to 50 μm in thickness with 40 μm being well suited for vehicle applications. The thin metallic layer can include a metal such as chrome, satin nickel, aluminum, stainless steel, copper, bronze, silver, gold, etc.

In another embodiment of the disclosed subject matter, the radiation curable formulation for layer 3 is an ultraviolet light curing ink (UV ink). The UV inks are well suited for use in this embodiment because no solvents are released and the viscosity is not altered when exposed to the UV light source. Also, UV ink is particularly formulated to cure and dry when exposed to a UV light source. Furthermore, when UV ink is exposed to an ultraviolet light, the ink molecules polymerize into a hard ink film. Another advantage of using UV ink is that the drying time is very short.

The UV ink is applied onto layer 3 via any well known process, such as spraying, silk-screening, etc. After exposure to the UV light source, the ink polymerizes and forms a plurality of dots that can take the form of many various shapes and patterns. The plurality of dots from the spraying/silk-screening and subsequent hardening of the UV ink provide the element with a 3-dimensional tactile texture. The plurality of dots influences how the light is reflected, which affects the final decorative and three-dimensional appearance. Thus, the arranged pattern may be manipulated to achieve the desired appearance on the substrate. The plurality of dots can occupy any amount of surface area as determined by design requirements. The shape of the dots can vary widely, including elongate wood simulation patterns, circles, squares, other geometric shapes, brail, indicia, logos, etc.

Thus, when an element such as a trim piece for an automobile is coated by the decorative coating process, a decorative and three-dimensional tactile appearance can be produced. This not only provides an improved visual appearance, it also helps in hiding defects, such as surface defects, on different elements.

Figure 3:
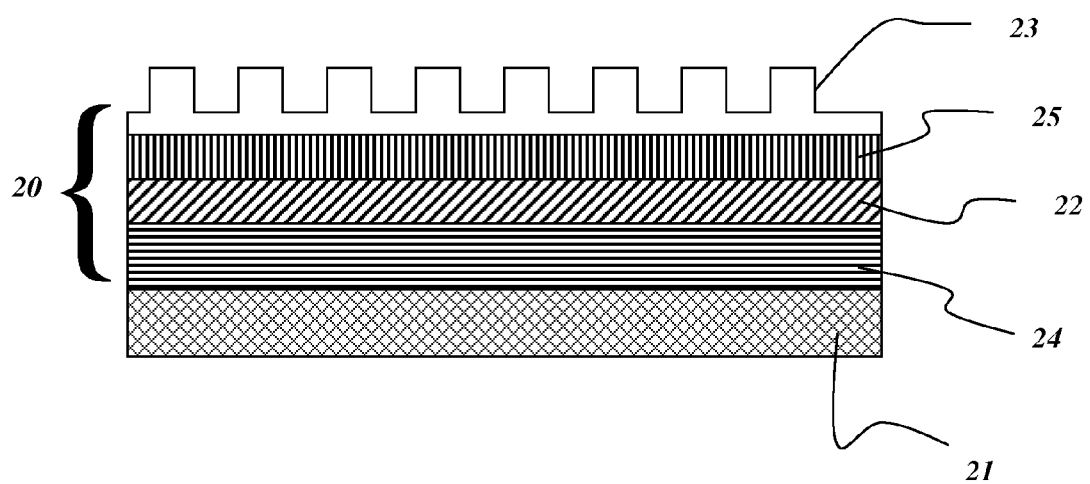
FIG. 3 is a cross-sectional view of another embodiment of an element formed by a method according to the disclosed subject matter.

FIG. 3 shows a cross-sectional view of another embodiment of a 3-D film on a substrate in accordance with principles of the disclosed subject matter. In this embodiment, a UV hardened ink 23 is located on a polymethylmethacrylate (PMMA) layer 25. A real metallic print layer 22 is located below the PMMA layer 25 and above an acrylonitrile butadiene styrene (ABS) tie layer 24. All of the above layers 22-25 can be considered to be the "film" 20 that can be located on a substrate, such as a polycarbonate/acrylonitrile butadiene styrene (PC/ABS) substrate. In particular, the PC/ABS substrate 21 can be a vehicle surface substrate, such as a vehicle door garnish, vehicle steering wheel garnish, vehicle shifter escutcheon, vehicle cup holder, vehicle audio panel, etc. The film 20 can be separately applied to the vehicle surface substrate by various processes, including vacuum or pressure forming in combination with injection molding, as explained in more detail below.

The real metallic print layer 22 can be applied by PVD or other known coating/attachment method, and can be anywhere from 200-600 Angstroms in thickness. The UV hardened ink 23 can be 40 μm thick, while the PC/ABS substrate 21 can be 2 mm thick and the film 20 can be a total of approximately 1 mm thick. The ABS tie layer 24 can be provided under the PMMA layer 25 to assist attachment of the film 20 to the PC/ABS substrate 21. The PMMA layer 25 can be a clear layer that contains UV additives and generally serves as a protective layer to prevent scratching or deterioration of the film and other component materials.

It is contemplated that other materials can be used for the various film and substrate layers. For example, the PC/ABS substrate 21 can be replaced with an ABS substrate, or other known substrate. One alternative embodiment can include a polypropylene tie layer in place of the ABS tie layer 24, and a polypropylene substrate instead of the PC/ABS substrate 21. The real metallic layer 22 can also be replaced with a pigment layer to create the wood grain design, as described above, or to form other decorative appearances for the film 20. If desired, one could place the UV hardened ink on top of the wood grain pigment layer to provide a true feel of wood grain with knots, etc.

Figures 4A, 4B, 4C:
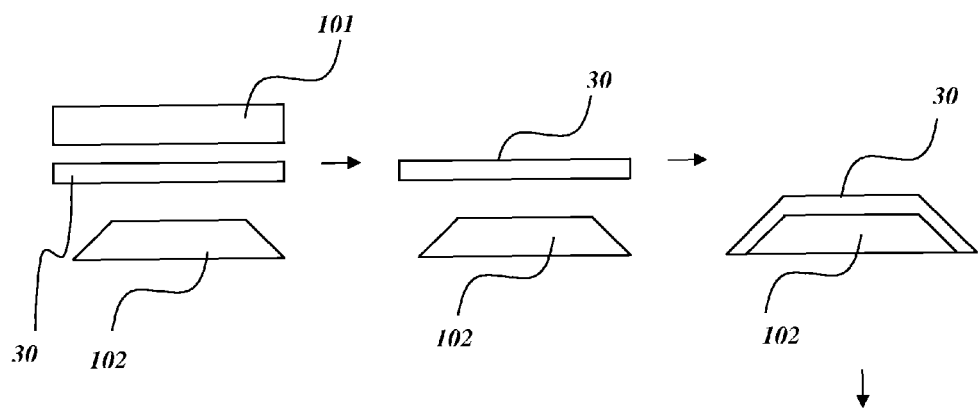
FIG. 4 is a schematic showing process steps according to an embodiment of the disclosed subject matter.
Figures 4D, 4E, 4F:
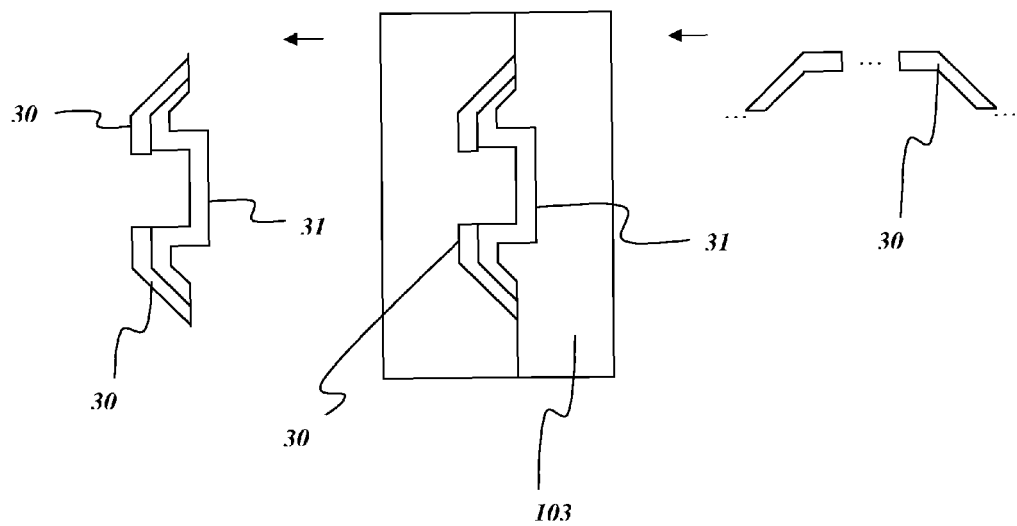

FIGS. 4a-4f show an example of a manufacturing method for applying a coating to a substrate in accordance with principles of the disclosed subject matter. In FIG. 4a, a film 30 is heated by heater 101 located above a mold 102. The heater 101 is then removed, as shown in FIG. 4b, and the film 30 is vacuum formed (or pressure formed, etc.) onto the mold 102 as shown in FIG. 4c. After vacuum forming the film 30, the film 30 can be trimmed by any conventional trimming process, as shown in FIG. 4d, to an appropriate shape. After trimming the film 30 into the desired shape, the film 30 is placed within an injection mold 103 and the mold is then closed containing the film 30, as shown in FIG. 4e. After the injection mold 103 is closed, a substrate material is injected into the mold cavity such that it is formed onto the film 30. The film 30 is thus attached to the substrate 31 and can be ejected from the mold 103. FIG. 4f shows the final product ejected from the injection mold 103.

Typically a vacuum forming process is used in the method of forming the film 30 onto the mold 102 such that the film is "pulled down" onto the shape of the mold 102. However, if the geometry of the final film form is more complicated or intricate, then pressure forming is commonly used. For example, vacuum forming is often used when forming a film onto a substrate that is to be used on a vehicle cup holder, a vehicle shifter escutcheon, and other uncomplicated structures. However, pressure forming is usually used to form a film for a vehicle audio panel and other similarly complicated structures in a vehicle.

It should be noted that injection molding, as shown in FIG. 4e, typically reduces the height of the three-dimensional tactile surface provided by the UV ink layer 23. This is due to the fact that the UV hardened ink sinks into the PMMA layer 25 during injection molding. However, this characteristic is not observable by customers, and can be compensated for by increasing the thickness of the UV ink layer 23.

There are two main categories of UV hardenable ink that can be used in conjunction with the disclosed subject matter. The first is hard UV ink that is commonly used in vehicle substrate surface applications. The other type is stretchable UV inks. Stretchable UV inks provide more visual effect options, and better effect quality, but do not provide the amount of three dimensional texture as provided by hard UV inks.

It is conceivable that both hard UV inks and stretchable UV inks can be used to manufacture a vehicle surface substrate in accordance with principles of the disclosed subject matter. For example, a stretchable UV ink can be screened onto a PMMA layer to provide an intricate graphic design. Then, a second PMMA layer (or other protective layer) could be applied on top of the stretchable UV ink, and a hard UV ink applied on top of that second protective PMMA layer. The hard UV ink would provide the tactile feature to the vehicle substrate surface while the stretchable UV ink provides the more intricate design/colorations.

While the disclosed subject matter has been described in detail with reference to exemplary embodiments thereof, it will be apparent to one skilled in the art that various changes can be made, and equivalents employed, without departing from the scope of the invention. Each of the documents referenced above is hereby incorporated by reference in its entirety.

What is claimed is:

1. A vehicle structure including a three dimensional coating, comprising:
   a film, including,
      a metallic layer,
      an acrylonitrile butadiene styrene tie layer, and
      a hardened ink located on top of the metallic layer, wherein the hardened ink is located in a plurality of areas that are separate and distinct from each other and extend away from the metallic layer to such an extent that the separate and distinct areas of hardened ink form a three-dimensional pattern that is discernable to a human touch; and
   a vehicle surface substrate located below the film, wherein the hardened ink is a UV curable ink, and
      wherein the acrylonitrile butadiene styrene tie layer is located in direct contact with the metallic layer and the vehicle surface substrate.

2. A method of providing the vehicle structure including the three-dimensional coating of claim 1, comprising:
   forming the film by
      applying a thin layer to a film substrate using a metallizing technique to form the metallic layer;
      applying a radiation curable formulation on top of the thin layer; and
      exposing the radiation curable formulation to a radiation source to produce a three-dimensional tactile pattern on top of the thin layer and to form the hardened ink; and
   injection molding the film onto the vehicle surface substrate.

3. The method of claim 2, wherein the thin layer has a metallic appearance.

4. The method of claim 2, wherein the thin layer is a metal selected from at least one of chrome, satin nickel, aluminum, stainless steel, copper, bronze, silver, and gold.

5. The method of claim 2, wherein the metallizing technique is selected from physical vapor deposition and chemical vapor deposition.

6. The method of claim 2, wherein the vehicle surface substrate is formed as one of a vehicle audio panel, a vehicle shifter escutcheon, a vehicle door garnish, a vehicle steering wheel garnish, and a vehicle cup holder.

7. The method according to claim 6, wherein the physical vapor deposition is selected from ion plating, ion implantation, and sputtering.

8. The method of claim 2, wherein the radiation curable formulation is UV ink.

9. The method of claim 2, wherein the three-dimensional tactile pattern includes a plurality of dots.

10. The method of claim 9, wherein the plurality of dots is elongated in shape and simulates wood grain.

11. The method of claim 9, wherein at least some of the plurality of dots are shaped as indicia.

12. The method of claim 2, wherein forming a film includes applying the tie layer to the metallic layer to assist in attachment between the film and the vehicle surface substrate.

13. The method of claim 12, wherein the tie layer is at least one of a polycarbonate acrylonitrile butadiene styrene tie layer and an acrylonitrile butadiene styrene tie layer, and the vehicle surface substrate is at least one of a polycarbonate acrylonitrile butadiene styrene substrate and an acrylonitrile butadiene styrene substrate.

14. The method of claim 12, wherein the tie layer includes a polypropylene tie layer and the vehicle surface substrate is a polypropylene substrate.

15. The method of claim 2, wherein the radiation curable formulation on top of the thin layer is applied via a silk screening process.

* * * * *